(12) United States Patent
Wang He et al.

(10) Patent No.: US 9,268,105 B2
(45) Date of Patent: Feb. 23, 2016

(54) OPTICAL CONNECTOR

(71) Applicant: HON HAI PRECISION INDUSTRY CO., LTD., New Taipei (TW)

(72) Inventors: Li-Ying Wang He, New Taipei (TW); Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 156 days.

(21) Appl. No.: 14/066,709

(22) Filed: Oct. 30, 2013

(65) Prior Publication Data

US 2014/0314426 A1   Oct. 23, 2014

(30) Foreign Application Priority Data

Apr. 19, 2013   (TW) .............................. 102113884 A

(51) Int. Cl.
    *G02B 6/42*   (2006.01)
(52) U.S. Cl.
    CPC ........................ *G02B 6/42* (2013.01)
(58) Field of Classification Search
    CPC ........................ H04B 10/801–10/803
    See application file for complete search history.

(56) References Cited

U.S. PATENT DOCUMENTS

| | | | | |
|---|---|---|---|---|
| 7,441,965 | B2* | 10/2008 | Furuno et al. | 385/93 |
| 8,915,657 | B2* | 12/2014 | Inoue et al. | 385/91 |
| 2004/0184737 | A1* | 9/2004 | Oono et al. | 385/52 |
| 2004/0234210 | A1* | 11/2004 | Nagasaka et al. | 385/88 |
| 2008/0036103 | A1* | 2/2008 | Ban et al. | 264/1.25 |
| 2014/0084190 | A1* | 3/2014 | Lin | 250/578.1 |

* cited by examiner

*Primary Examiner* — Ken Vanderpuye
*Assistant Examiner* — Merlin Brito Peguero
(74) *Attorney, Agent, or Firm* — Novak Druce Connolly Bove + Quigg LLP

(57) ABSTRACT

An optical connector includes a printed circuit board, at least one emitter, at least one receiver, a coupler, and a number of positioning poles. The printed circuit board includes an assembling surface defining a number of first positioning recesses therein. The emitter and the receiver are electrically connected to the assembling surface of the printed circuit board. The coupler includes a bottom surface facing toward to the printed circuit board and at least two first lenses corresponding to the emitter and the receiver. The coupler defining a number of second positioning recesses in the bottom surface corresponding to the first positioning recesses. The positioning poles are positioned between the printed circuit board and the coupler, with one end of each positioning pole inserting and being fixed into a first positioning recess and the other end of each positioning pole inserting and being fixed into a second positioning recess.

8 Claims, 4 Drawing Sheets

OPTICAL CONNECTOR

BACKGROUND

1. Technical Field

The present disclosure relates to communication devices, and particularly to an optical connector.

2. Description of Related Art

Optical connectors include a printed circuit board, an emitter, a receiver, and a coupler. The emitter and the receiver are positioned on the circuit board. The coupler optically couples the emitter and receiver to optical fibers. The coupler generally includes a bottom surface and defines a groove in the bottom surface for receiving a number of lenses corresponding to the emitter and the receiver. In assembly, the bottom surface of the coupler is attached to the printed circuit board, and the emitter and the receiver are respectively aligned with the lenses. The coupler is typically attached to the printed circuit board using adhesive, which may contaminate the lenses.

Therefore, what is needed is an optical connector addressing the limitations described.

BRIEF DESCRIPTION OF THE DRAWING

The components of the drawing are not necessarily drawn to scale, the emphasis instead being placed upon clearly illustrating the principles of the embodiments of the present disclosure.

DETAILED DESCRIPTION

Figure 1:
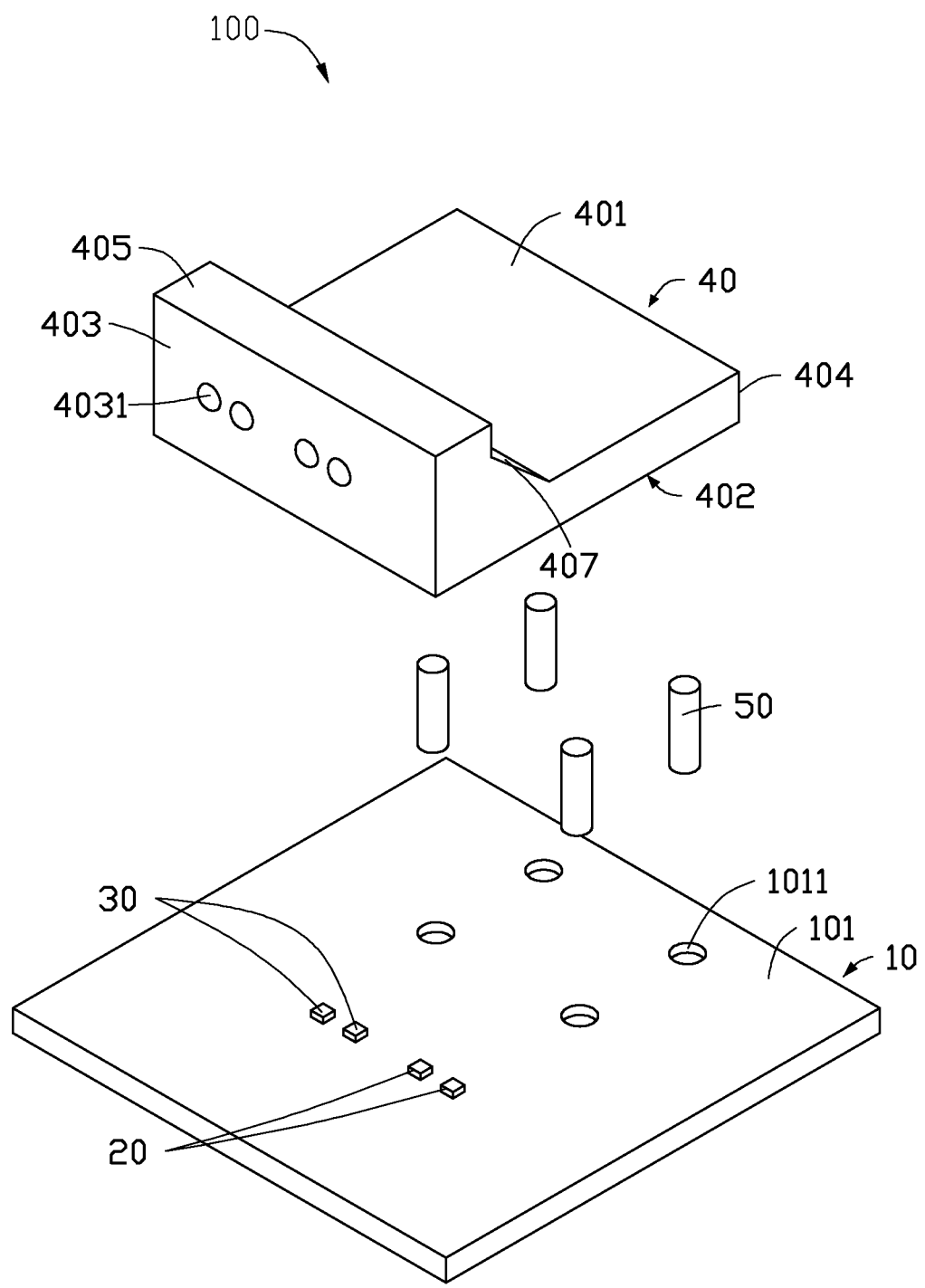
FIG. 1 is an isometric, exploded view of an optical connector, according to an exemplary embodiment of the present disclosure.
Figure 2:
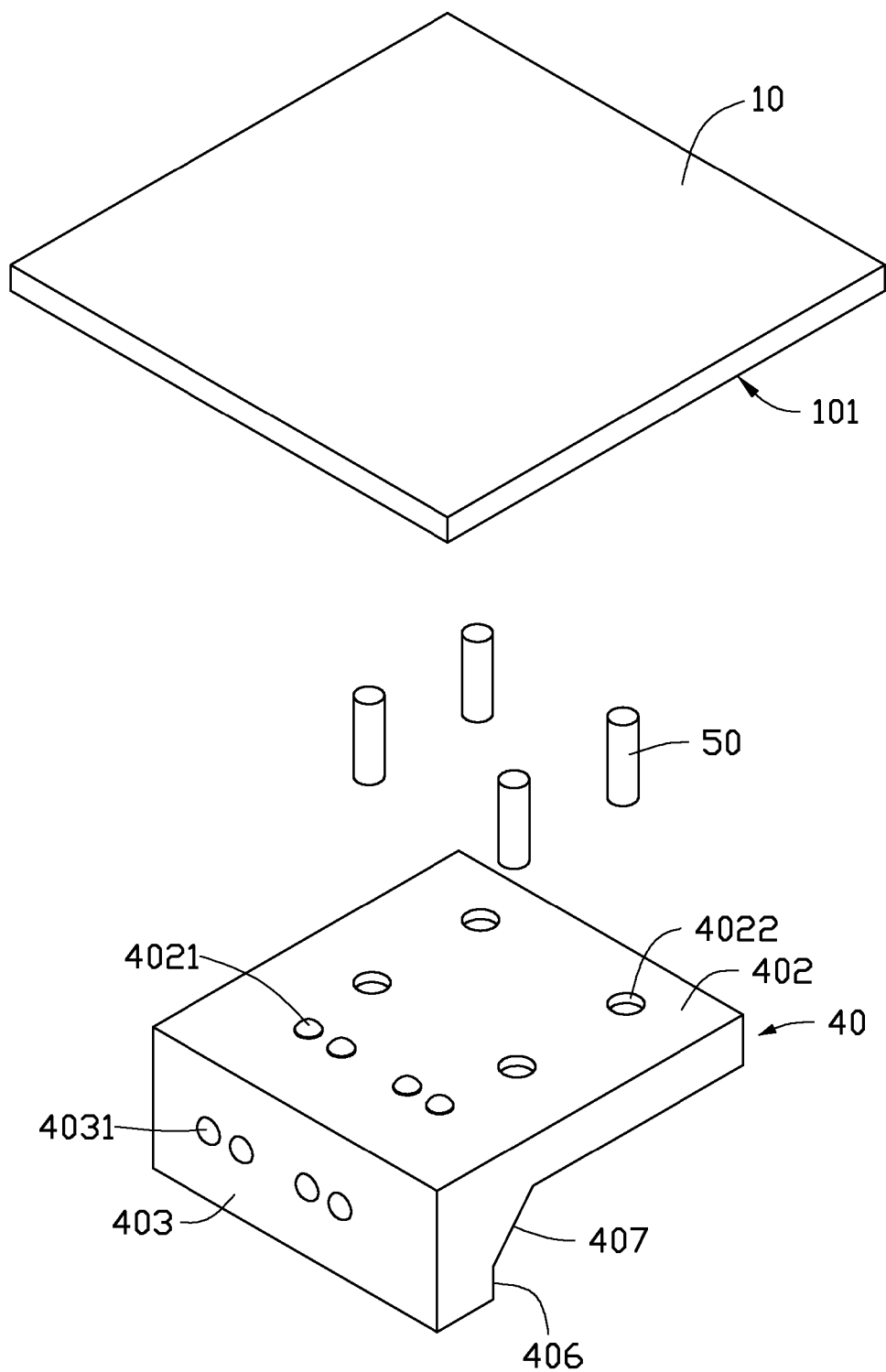
FIG. 2 is similar to the FIG. 1, but shows the optical connector from another angle.

FIGS. 1 and 2 show an optical connector 100 of an exemplary embodiment of the present disclosure. The optical connector 100 includes a printed circuit board 10, a number of emitters 20, a number of receivers 30, a coupler 40, and a number of positioning poles 50.

The printed circuit board 10 includes an assembling surface 101. The assembling surface 101 defines a number of first positioning recesses 1011 corresponding to the positioning poles 50. In this embodiment, the number of the first positioning recesses 1011 is four. Each first positioning recess 1011 is substantially a blind circular hole.

The emitters 20 are configured for emitting light carrying signals, and the receivers 30 are configured for receiving light carrying signals. The emitters 20 and the receivers 30 are electrically connected to the printed circuit board 10. The emitters 20 and the receivers 30 are linearly arranged. In this embodiment, the number of the emitters 20 and the receivers 30 are both two. The emitters 20 are laser diodes or light emitting diodes, and the receivers 30 are photodiodes.

The coupler 40 includes a top surface 401, a bottom surface 402 opposite to the top surface 401, a first end surface 403 connected the bottom surface 402. A second end surface 404 opposite to the first end surface 403, an upper surface 405 connected to the first end surface 403, a side surface 406 connected to the upper surface 405. In addition, a reflecting surface 407 connected between the side surface 406 and the top surface 401. The top surface 401 is substantially parallel to the bottom surface 402. The first end surface 403 and the second end surface 404 are substantially perpendicular to the bottom surface 402 and the top surface 401. The upper surface 404 is substantially perpendicular to the first end surface 404, and the side surface 406 is substantially perpendicular to the upper surface 405. A perpendicular distance between the upper surface 405 and the bottom surface 402 is larger than that between the top surface 401 and the bottom surface 402.

The coupler 40 includes a number of first lenses 4021 formed on the bottom surface 402 and a number of second lenses 4031 formed on the first end surface 403 and corresponding to the first lenses 4021. The first lenses 4021 are arranged along a linear direction, and the second lenses 4031 are arranged along another linear direction. An angle between an optical axis of each first lens 4021 and the reflecting surface 407 is 45 degrees, and an angle between an optical axis of each second lens 4031 and the reflecting surface 407 is 45 degrees. In this embodiment, the numbers of the first lenses 4021 and the second lenses 4021 are both four. The coupler 40 defines a number of second positioning recesses 4022 in the bottom surface 402 corresponding to the first positioning recesses 1011. In this embodiment, the number of the second positioning recesses 4022 is four. Each second positioning recess 4022 is substantially a blind circular hole.

The positioning poles 45 are substantially cylindrical-shaped. A diameter of each positioning pole 45 is slightly less that that of a corresponding first positioning recess 1011 and a corresponding second positioning recess 4022. In this embodiment, the number of the positioning poles 45 is four.

Figure 3:
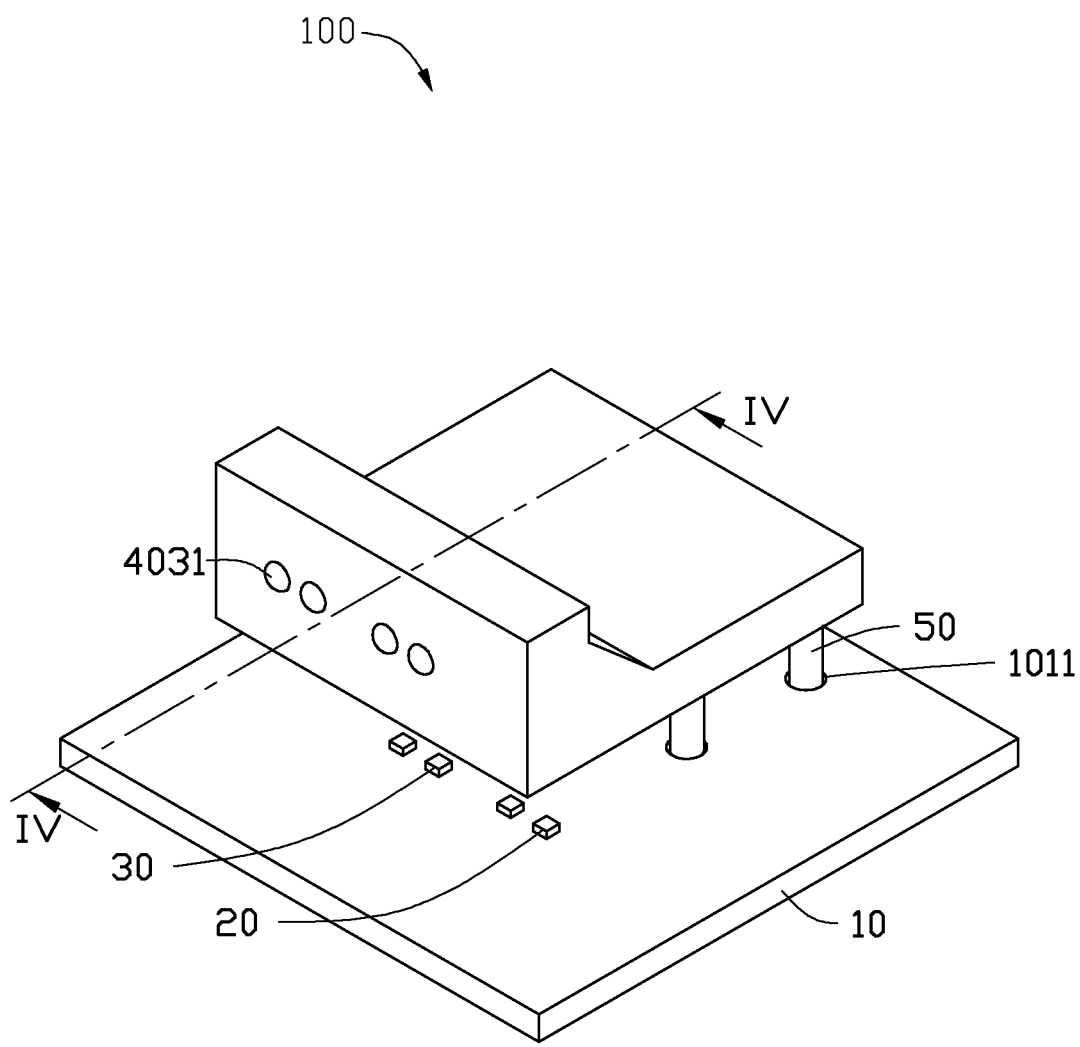
FIG. 3 is an assembled view of the optical connector of FIG. 1.
Figure 4:
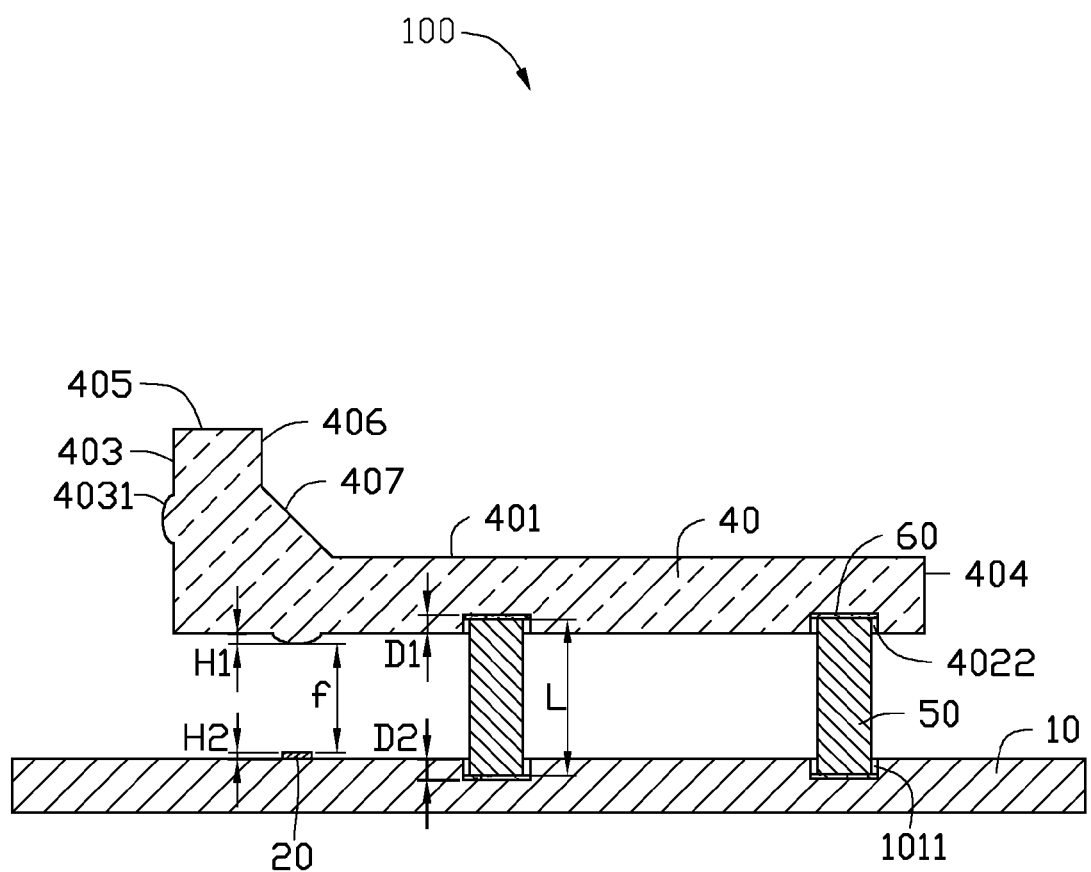
FIG. 4 is a cross sectional view of the connector of FIG. 3, taken along line IV-IV.

FIGS. 1, 3 and 4 show that in assembly, an adhesive 60 is distributed into each first positioning recess 1011 and each second positioning recess 4022, an end of each positioning pole 50 is inserted into a corresponding first positioning recess 1011, and another end of each positioning pole 50 is inserted into a corresponding second positioning recess 4022. The positioning poles 50 are fixedly connected to the printed circuit board 10 and the coupler 40 by the adhesive 60, in other words, the coupler 40 is fixedly supported above the printed circuit board 10 by the positioning poles 50. The bottom surface 402 of the coupler 40 faces toward the printed circuit board 10. Each of the emitters 20 and the receivers 30 are aligned with a corresponding first lenses 4021. In such a manner, a contamination to the first lenses 4021 can be avoided during the assembling process of the coupler 40, and a deviation of the coupler 40 also can be avoided during the assembling process of the coupler.

The optical connector 100 satisfies the formula:

$$L = f + D1 + D2 + H1 + H2,$$

wherein L is a height of each positioning pole 50, f is a focal length of each first lens 4021, D1 is a depth of each first positioning recess 1011, D2 is a depth of each first positioning recess 4022, H1 is a height of each first lens 4021, and H2 is a height of each of the emitters 20 and receivers 30. In this embodiment, a thickness of the adhesive 60 is very small and can be omitted. Therefore, a perpendicular distance between each of the emitters 20 and receivers 30 and a corresponding first lens 4021 is substantial equal to the focal length f of the first lens 4021, an optimal optical signal transmitting efficiency between the first lenses 4021 and the emitter 20 and receivers 30 can be ensured.

It is understood that the number of the emitters 20, the receivers 30, and the first and second lenses 4021, 4031 can be changed according to different requirements. The number of the positioning poles 50, the first positioning recesses 1011, and the second positioning recesses 4022 can also be changed according to different requirements.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical connector, comprising:
   a printed circuit board comprising an assembling surface, the printed circuit board defining a plurality of first positioning recesses in the assembling surface;
   at least one emitter electrically connected to the assembling surface of the printed circuit board, for emitting light carrying signals;
   at least one receiver electrically connected to the assembling surface of the printed circuit board, for receiving light carrying signals;
   a coupler comprising a bottom surface facing toward the printed circuit board and at least two first lenses spatially corresponding to the at least one emitter and the at least one receiver, the coupler defining a plurality of second positioning recesses in the bottom surface corresponding to the first positioning recesses; and
   a plurality of positioning poles positioned between the printed circuit board and the coupler, one end of each positioning pole inserting and being fixed into a respective one of the first positioning recesses and the other end of each positioning pole inserting and being fixed into a respective one of the second positioning recesses, the positioning poles supporting the coupler above the printed circuit board and optically aligning the at least one emitter and the least one receiver with the at least two first lenses;
   wherein a distance between each emitter of the at least one emitter and each receiver of the at least one receiver and a corresponding first lens is equal to a focal length of the at least two first lenses.

2. The optical connector of claim 1, wherein the coupler comprises a top surface opposite to the bottom surface, a first end surface connected the bottom surface, a second end surface opposite to the first end surface, an upper surface connected to the first end surface, a side surface connected to the upper surface, and a reflecting surface connected between the side surface and the top surface for reflecting optical signals for a predetermined angle.

3. The optical connector of claim 2, wherein the first end surface is perpendicular to the bottom surface, a distance between the upper surface and the bottom surface is larger than a distance between the top surface and the bottom surface.

4. The optical connector of claim 3, wherein the coupler comprises at least two second lenses formed on the first end surface and corresponding to the at least two first lenses.

5. The optical connector of claim 4, wherein an angle between an optical axis of each first lens and the reflecting surface is 45 degrees, and an angle between an optical axis of each second lens and the reflecting surface is 45 degrees.

6. The optical connector of claim 1, wherein each of the first and second positioning recesses is substantially a blind circular hole.

7. The optical connector of claim 6, wherein each positioning pole is fixed into a respective one of the first recesses and a respective one of the second positioning recesses by an adhesive.

8. The optical connector of claim 1, wherein the number of the positioning poles is four.

* * * * *